(12) United States Patent
Albadawi et al.

(10) Patent No.: US 12,025,145 B2
(45) Date of Patent: Jul. 2, 2024

(54) METHOD FOR MANUFACTURING A PROPELLER FOR A PROPELLER PUMP, AND PROPELLER FOR A PROPELLER PUMP

(71) Applicant: Sulzer Management AG, Winterthur (CH)

(72) Inventors: Abdulaleem Albadawi, Waterford (IE); Horst-Paul Klein, Lohmar (DE)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 18/098,007

(22) Filed: Jan. 17, 2023

(65) Prior Publication Data
US 2023/0235744 A1    Jul. 27, 2023

(30) Foreign Application Priority Data

Jan. 25, 2022 (EP) .................................. 22-153287

(51) Int. Cl.
| | | |
|---|---|---|
| F04D 29/18 | (2006.01) | |
| B23P 15/02 | (2006.01) | |
| F04D 3/00 | (2006.01) | |
| F04D 13/08 | (2006.01) | |

(52) U.S. Cl.
CPC ........... *F04D 29/181* (2013.01); *F04D 3/005* (2013.01); *F04D 13/08* (2013.01); *B23P 15/02* (2013.01)

(58) Field of Classification Search
CPC ........ F04D 3/005; F04D 13/08; F04D 29/181; F04D 29/183; B23P 15/02; F01D 5/147; F05D 2230/10; F05D 2230/14; F05D 2230/18; F05D 2230/53; Y10T 29/49336
See application file for complete search history.

(56) References Cited

U.S. PATENT DOCUMENTS

| | | | | |
|---|---|---|---|---|
| 1,596,459 | A | * | 8/1926 | Schmidt .................. F04D 3/005 415/207 |
| 3,664,001 | A | * | 5/1972 | Pilarczyk ............ F04D 29/4206 415/214.1 |
| 4,166,310 | A | | 9/1979 | Rothe et al. |
| 7,740,449 | B1 | | 6/2010 | Brown et al. |

(Continued)

FOREIGN PATENT DOCUMENTS

GB          2417988 A          3/2006

OTHER PUBLICATIONS

European Search Report issued Jul. 18, 2022 in corresponding European Application No. 22153287.2.

*Primary Examiner* — Topaz L. Elliott
*Assistant Examiner* — Jason G Davis
(74) *Attorney, Agent, or Firm* — GLOBAL IP COUNSELORS, LLP

(57) ABSTRACT

A method for manufacturing a propeller for a propeller pump includes providing a base propeller including a hub extending from an axial end in the axial direction, and a plurality of blades fixedly connected to the hub, each blade including a pressure side, a suction side, a leading edge, an initial trailing edge, and a blade tip extending from the leading edge to the initial trailing edge at the end of the blade facing away from the hub, trimming each of the blades of the base propeller the axial direction, and forming a modified trailing edge bye removing a part of the initial trailing edge along the entire pressure side from the hub to the blade tip.

15 Claims, 5 Drawing Sheets

(56) References Cited

U.S. PATENT DOCUMENTS

| | | | |
|---|---|---|---|
| 9,556,884 B2 * | 1/2017 | Burman | F04D 29/542 |
| 10,294,956 B2 * | 5/2019 | Topaz | F04D 29/181 |
| 2002/0119048 A1 | 8/2002 | Burgess | |

* cited by examiner

METHOD FOR MANUFACTURING A PROPELLER FOR A PROPELLER PUMP, AND PROPELLER FOR A PROPELLER PUMP

CROSS-REFERENCE TO RELATED APPLICATION

This application claims priority to European Patent Application No. 22156326.5 filed Feb. 11, 2022, the contents of which are hereby incorporated by reference in their entirety.

BACKGROUND

Technical Field

The disclosure relates to a propeller for a propeller pump and a method for manufacturing a propeller for a propeller pump.

Background Information

Conventional propeller pumps are rotodynamic pumps having at least one impeller, wherein the impeller is configured as an axial impeller. This axial-flow impeller is also referred to as a propeller. Usually, a propeller is an axial-flow impeller having a specific speed of at least 100, or even at least 160. Propeller pumps are for example used for applications where a large volume of a liquid such as water has to be pumped to relatively low heads. Propeller pumps can be designed to convey water volumes of up to 7000 liters per second to a head of up to 12 meters. For many applications propeller pumps are configured as submersible pumps, e.g. for storm water protection, irrigation, aquaculture, industrial raw and process water handling, conveying of sewage or wastewater.

Typically, the hydraulic part of a propeller pump comprises a bell mouth inlet with a wear ring the propeller and a diffuser arranged downstream of the propeller.

In order to cover the full range of applications the propeller has to be adapted to the particular application. There are two different types of propellers known in the art, namely propellers having a plurality, for example three blades with a skewed design which are fixedly connected to the hub of the propeller without any possibility of an adjustment of the blades, and propellers having a plurality, for example three or four blades, each of which is adjustable with respect to its particular pitch angle.

SUMMARY

Regarding the adjustable blade propellers, it has been determined that the process of setting the right pitch angle for a particular application has proven to be quite complicated. The process has to be performed during the pump assembly. The adjustment process usually requires an iterative procedure until the desired performance target curve is at least approximately achieved. Sometimes it might even be impossible to exactly adjust the propeller to the desired duty point, so that a compromise between the desired duty point and the achievable duty point is necessary. Furthermore, the adjustment of the propeller blades may considerably increase the lead time of assembly process.

The configuration with the fixed, i.e. non-adjustable blades has the disadvantage, that a considerable amount of different propeller sizes has to be available in order to cover the full range of applications. Usually, the propellers are casted, thus, for each and every configuration of the propeller or for each desired head-flow curve, respectively, a specific pattern or casting mold had to be available. Since this is not feasible in practice, the number of different propellers is restricted to an economically reasonable value. As a consequence it is quite often necessary to look for a compromise between the desired duty point and the different available propellers, meaning that the desired duty point does not coincide with one of the best efficiency duty points of the available propellers.

This issue is addressed by the invention, embodiments of which are described herein.

It is therefore an object of the disclosure to propose a method for manufacturing a propeller for a propeller pump, which method allows for a better adjustment of the duty point of the propeller to a desired or predefined duty point. Furthermore, it is an object of the disclosure to propose such a propeller and a propeller pump having the propeller.

The subject matter of the disclosure satisfying these objects is characterized by the features set forth below.

Thus, according to the disclosure, a method for manufacturing a propeller for a propeller pump is proposed, wherein the propeller is designed for rotating about an axial direction, wherein a base propeller is provided, comprising a hub extending from an axial end in the axial direction, and a plurality of blades fixedly connected to the hub, wherein each blade comprises a pressure side, a suction side, a leading edge, an initial trailing edge, and a blade tip extending from the leading edge to the initial trailing edge at the end of the blade facing away from the hub, wherein each of the blades of the base propeller is trimmed regarding the axial direction, and wherein a modified trailing edge is formed by removing a part of the initial trailing edge along the entire pressure side from the hub to the blade tip.

According to the disclosure it is proposed to provide a base propeller which can be adapted to many different applications or many different duty points by an axial trimming of the blades, i.e. by removing a part of the initial trailing edge.

The blades are fixedly connected to the hub, such that the blades are not adjustable. In particular, the pitch angle of the blades cannot be changed but is fixed. Therefore, the lead time for the assembly or the commissioning of a propeller pump having a propeller manufactured according to the disclosure is considerably reduced as compared to configurations with adjustable blades, where the pitch angle of the blades has to be adjusted.

Thus, instead of the adjustable blades requiring the quite complex adjustment process of the pitch angle of the blades, the propeller manufactured according to the disclosure has a fixed, i.e. non-adjustable pitch angle of the blades and the adaption to the specific application is achieved by the axial trimming of the blades. Using the axial trimming for the adjustment allows for a considerably more precise adaption of the duty point to the desired or predefined duty point.

For covering the entire performance range, it is sufficient to provide for a very limited number of different base propellers, for example two different base propellers, one for a first region of the performance range and one for a second region of the performance range, wherein the first and the second performance range complement each other to the entire performance range. Thus, for a specific application, one has to choose only between two base propeller and the selected base propeller is then adjusted by the axial trimming exactly to the required duty point.

This has the considerable advantage that only a very limited, for example two different patterns for the casting molds for casting the propellers have to be provided. Thereby the entire effort for casting the propellers can be remarkably reduced resulting in a more economic and efficient manufacturing process for the propeller.

Furthermore, since the base propeller is adapted to the specific application by the axial trimming, the radial dimension, in particular the (maximum) outer diameter of the base propeller remains unchanged. This has the advantage that no adjustment regarding the radial direction is required. For example, it is not necessary to modify a wear ring surrounding the propeller or to adjust the gap between the propeller and the wear ring, because the outer diameter of the propeller remains unchanged by the axial trimming. Furthermore, it is not necessary to modify a diffuser which can be provided downstream of the propeller.

Optionally, the position of the propeller with respect to the axial direction can be adjust after the axial trimming. Since the extension of the blades in the axial direction is reduced by the axial trimming, the axial position of the propeller can be adjusted such that the distance in axial direction between the propeller and the diffuser is the same for the propeller after the axial trimming as the axial distance between the base propeller and the diffuser. Thus, the axial position of the propeller can be adjusted such, that it remains always the same independently from how much of the initial trailing edge is removed during the axial trimming.

Preferably, each modified trailing edge is formed by machining, i.e. the trimming regarding the axial direction (axial trimming) is performed by machining such as milling, grinding or cutting.

Preferably, the axial trimming is performed such, that for each blade a first axial distance measured from the axial end of the hub along the hub to the initial trailing edge is smaller than a second axial distance measured from the axial end of the hub along the hub to the modified trailing edge.

For adapting the propeller to a specific application, it is preferred that a duly point for the propeller is provided, and that a trimming distance defined as the difference between the second axial distance and the first axial distance is adjusted such that the duty point is realized.

Preferably the modified trailing edge is formed in such a way that the length of the blade tip is reduced at the hub by an amount which essentially equals the trimming distance.

Preferably, the modified trailing edge is configured as a trailing face, wherein the trailing face is non-curved.

It is a further preferred measure that the trailing face is configured to include a trimming angle with the axial direction, wherein the trimming angle is measured between the trailing face and the hub, and wherein the trimming angle is at least 90°.

In addition it is preferred, that the modified trailing edge is formed by machining the initial trailing edge with the trimming angle in such a way that the length of the blade tip is reduced at the hub by an amount, which equals the trimming distance. Thus, the axial trimming is defined by two parameters, namely the trimming distance measured at the hub and the trimming angle.

Particularly in cases that require a large axial trimming it might be advantageous that at each blade a final trailing edge is formed by removing a part of the pressure side abutting against the modified trailing edge along the entire modified trailing edge, so that a transition face is produced connecting the pressure side with the final trailing edge. This additional and optional step of the method is referred to as overfiling.

Preferably, the transition face extends from the hub along the entire final trailing edge, wherein the transition face is inclined towards the pressure side.

Furthermore, it is preferred that the transition face is configured as a non-curved face.

It is a further preferred measure that the transition face is configured to include a filing angle with the axial direction with the filing angle being different from 90°.

According to a preferred embodiment the propeller comprises exactly three blades. In other preferred embodiments, the propeller has exactly four or five blades. In still other preferred embodiments the propeller has exactly two blades.

In addition, according to the disclosure a propeller for a propeller pump is proposed, wherein the propeller is manufactured according to a method according to the disclosure.

Furthermore, according to the disclosure a propeller pump for conveying a fluid is proposed, wherein the propeller pump comprises a propeller which is manufactured in accordance with the disclosure. Preferably, the propeller pump is configured as a submersible pump.

According to a preferred embodiment the propeller pump comprises a pump housing having an inlet and an outlet for the fluid, and further comprises a pump shaft for rotating the propeller about the axial direction, and a drive unit for rotating the pump shaft, wherein the propeller is fixedly connected to the pump shaft, and wherein the drive unit is arranged inside the pump housing.

Further advantageous measures and embodiments of the disclosure will become apparent from the description therein.

BRIEF DESCRIPTION OF THE DRAWINGS

The invention will be explained in more detail hereinafter with reference to embodiments of the invention and with reference to the drawings. There are shown in a schematic representation.

DETAILED DESCRIPTION

Figure 1:
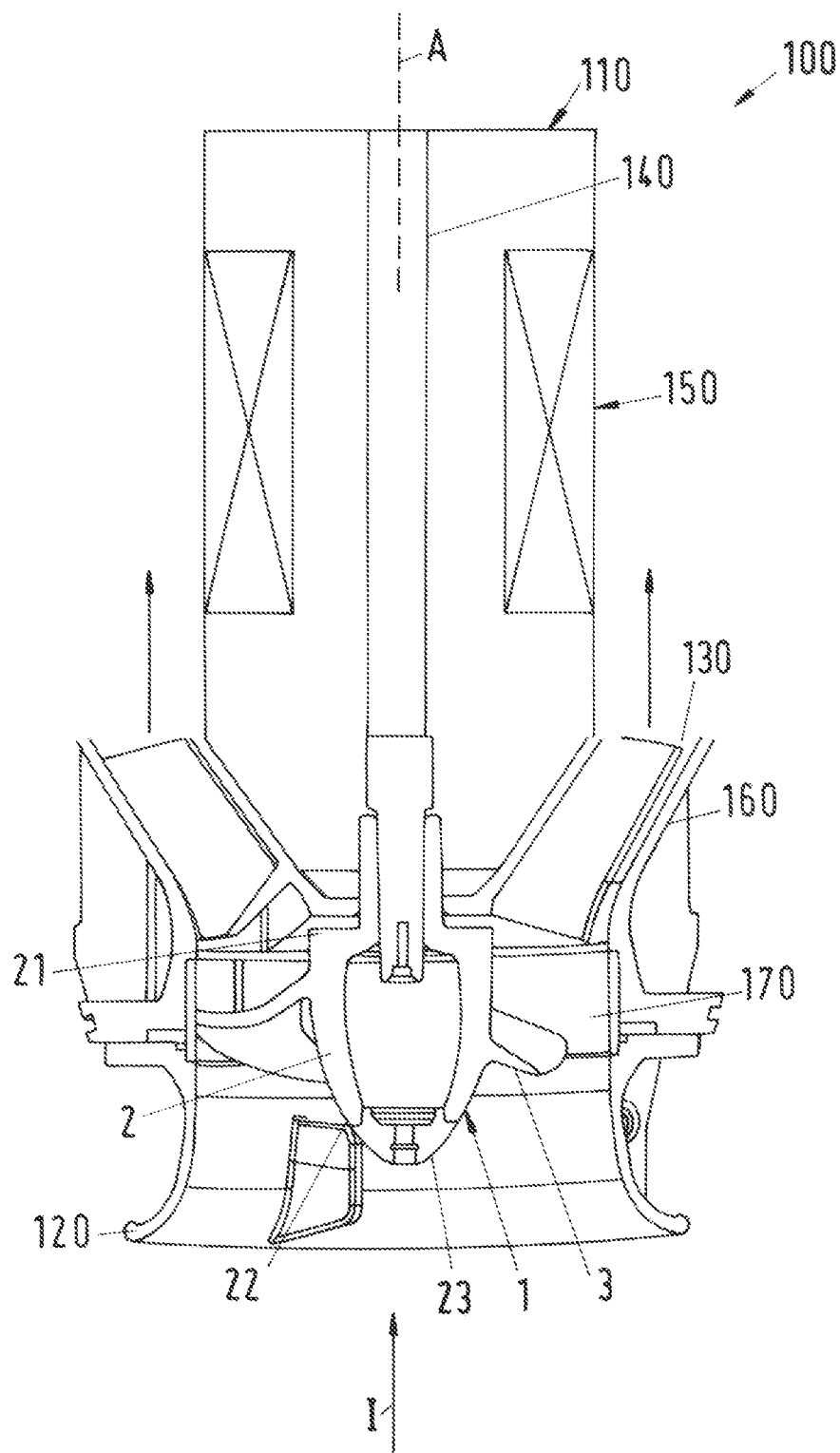
FIG. 1 is a schematic cross-sectional view of an embodiment of a propeller pump according to the invention.

FIG. 1 shows a schematic cross-sectional view of an embodiment of a propeller pump according to the disclosure, which is designated in its entity with reference numeral 100. The propeller pump 100 is a rotodynamic pump which is designed as a axial flow pump having at least one axial-flow impeller. The axial-flow impeller is referred as a propeller 1, hereinafter. Usually, the propeller 1 has a specific speed $n_q$ of at least 100, preferably at least 160. In particular, the propeller pump 100 is configured as a submersible pump 100. For example the propeller pump 100 can be mounted in a riser pipe for conveying water, such as clear water, wastewater, sewage, process water, raw water or other fluids.

In a matter known as such, the propeller pump 100 comprises a housing 110 having a inlet 120, through which the fluid, e.g. water, enters the propeller pump 100 as indicated by the arrow I in FIG. 1, and an outlet 130, through which the fluid is discharged as indicated by the arrows O. The propeller pump 100 further comprises a pump shaft 140 for rotating the propeller 1 about an axial direction A which is defined by the longitudinal axis of the pump shall 140. The propeller 1 is fixedly connected to the pump shaft 140 in a torque proof manner. The propeller 1 is fixed to an end of the pump shaft 140. The propeller pump 100 further comprises a drive unit 150 for rotating the pump shaft 140 about the axial direction A The drive unit 150 is arranged inside the pump housing 110. Preferably, the drive unit 150 is configured as an electric motor, for example as a high efficiency motor of at least the efficiency class 1E2. The drive unit 150 comprises a rotor, which is fixedly connected to the pump shaft 140 or constitutes a part of the pump shaft 140.

The inlet 120 is configured as a bell mouth inlet 120 for receiving the fluid at a suction pressure. A wear ring 170 is provided, which surrounds the propeller 1. The propeller 1 conveys the fluid in a diffuser 160 arranged downstream of the propeller 1. The fluid passes through the diffuser 160 and leaves the propeller pump through the outlet 130, which is configured as a ring-shaped outlet 130 extending along the circumference of the pump housing 110.

Other details of the propeller pump 100 such as the shaft bearing and a mechanical seal are not shown in FIG. 1. Such features are sufficiently known to the skilled person Preferably, the submersible propeller pump 100 is configured as a high flow low head pump 100. The propeller pump 100 can be configured, for example, to generate a flow of up to 7,000 liters per second at 50 Hz to a relatively low head of up to twelve meters.

The propeller 1 comprises a hub 2 extending from an axial end 21 to a distal end 22, at which a propeller cap 23 is provided. The propeller 1 further comprises a plurality of blades 3, for example three blades 3, which are fixedly connected to the hub 2.

The propeller 1 is configured with a fixed pitch, meaning that the pitch angle of the blades 3 cannot be adjusted or changed. Once the propeller 1 is manufactured the pitch angle is fixed and no more adjustable. Preferably, all blades 3 are formed integrally with the hub 2, i.e. the hub 2 and the blades 3 are made in one piece. Most preferred the propeller 1 comprising the hub 2 and the blades 3 is manufactured in a casting process. The hub 2 and the blades 3 are molded as a single part.

Figure 3:
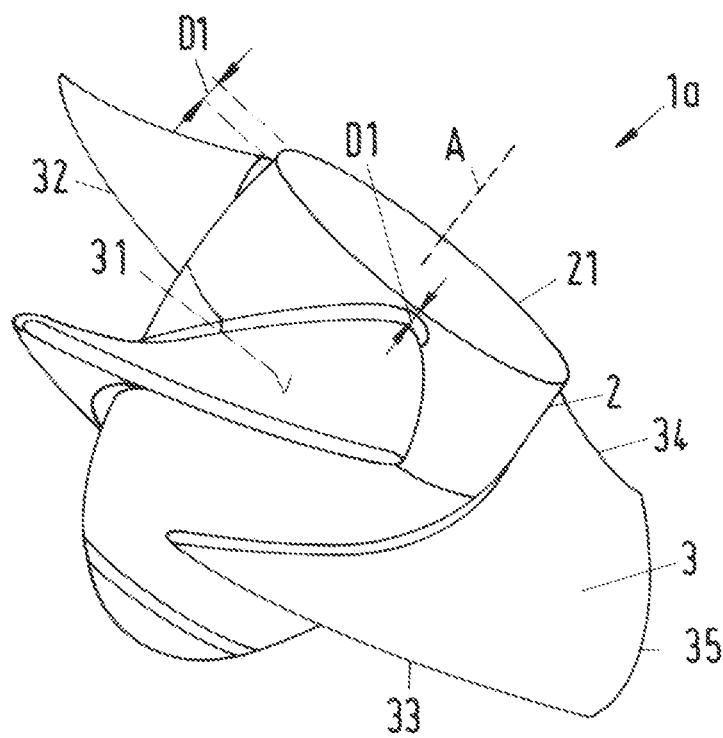
FIG. 3 is a perspective view of a base propeller for manufacturing an embodiment of a propeller according to the invention.

Now, the method of manufacturing the propeller 1 will be explained in more detail. For manufacturing the propeller 1, at first a base propeller 1a is provided comprising the hub 2 and the desired number of blades 3, for example three blades 3, wherein the blades 3 are configured with a predefined pitch angle. FIG. 3 shows a perspective view of the base propeller 1a. The base propeller 1a can be configured as a usual propeller 1 as it is state of the art for propeller pumps 1. All blades 3 of the plurality of blades 3 have the same shape, so that it is sufficient to refer to one blade 3 only.

Figure 2:
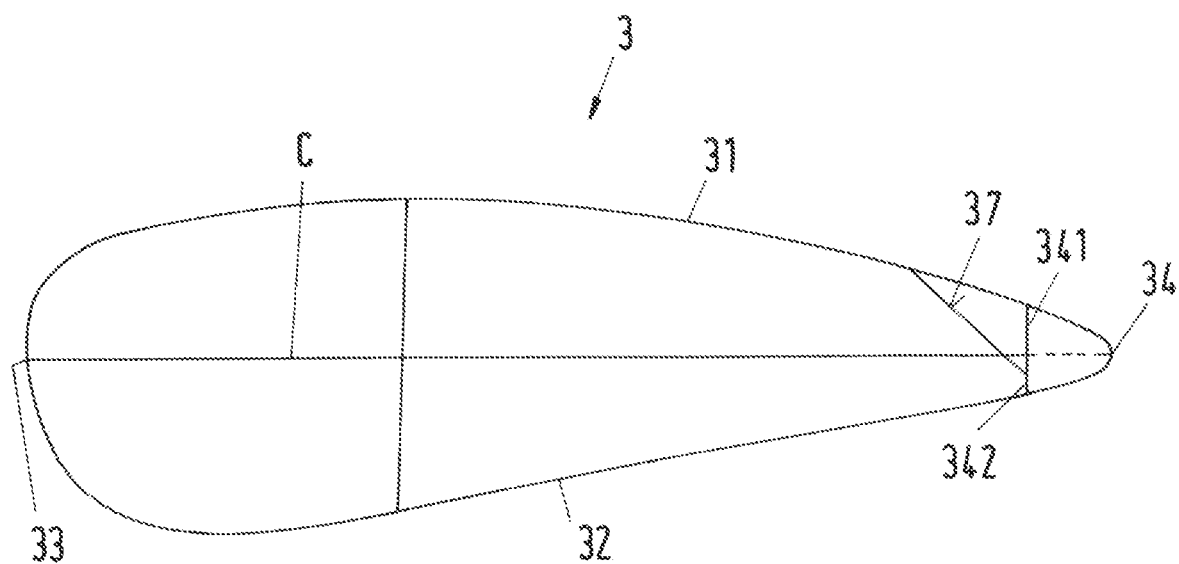
FIG. 2 is a profile of a blade of an embodiment of a propeller according to the invention.

For a better understanding, FIG. 2 shows an example of a profile of the blade 3. The profile is for example a NACA profile (NACA: National Advisory Committee for Aeronautics). It has to be understood, that FIG. 2 only shows an example for a profile of the blade 3. Usually, several profiles are combined to generate the blade 3 and the profiles are tilted and wrapped around a cylindrical shape, for example the hub 2, to generate the shape of the blade. However, the terms explained referring to FIG. 2 are usually common to all profiles.

Each blade 3 of the base propeller 1a comprises a pressure side 31, a suction side 32, a leading edge 33, an initial trailing edge 34, and a blade tip 35 (FIG. 3) extending from the leading edge 33 to the initial trailing edge 34 at the end of the blade 3 facing away from the hub 2. The profile of the blade 3 further comprises a chord line C. As it is common in the art, the chord line C is the imaginary straight line joining the leading edge 33 and the initial trailing edge 34.

Figure 4:
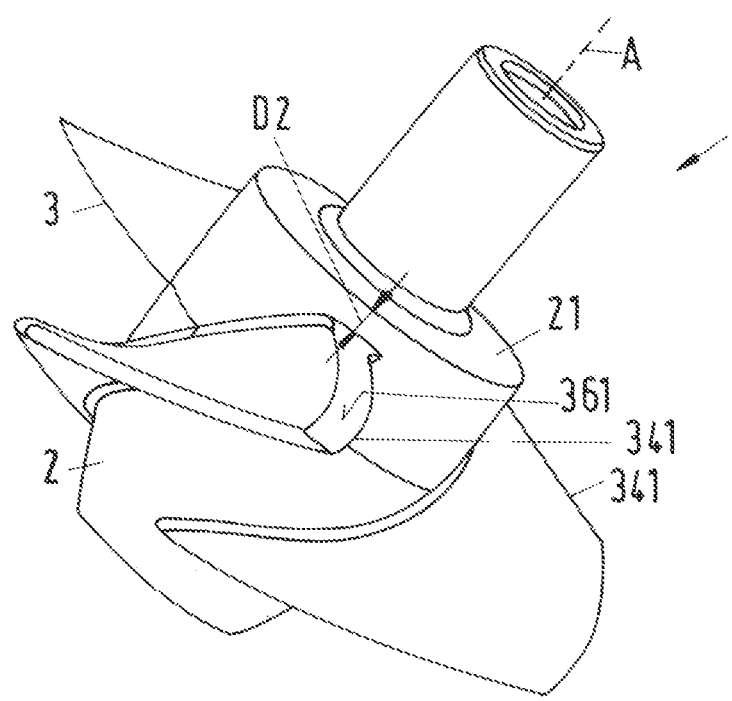
FIG. 4 is a perspective view of the propeller of FIG. 3 after the step of the axial trimming.

After the base propeller 1 has been provided an axial trimming of the initial trailing edge 34 is performed. Axial trimming means that a modified trailing edge 341 is formed by removing a part of the initial trailing edge 34 along the entire pressure side 31 (or suction side 32) from the hub 2 to the blade tip 35. FIG. 4 shows the propeller 1 having the modified trailing edge 341 after the axial trimming, i.e. after a part of the initial trailing edge 34 has been removed from the hub 2 to the blade tip 35.

Preferably, the modified trailing edge 341 is formed by machining, for example by milling, grinding or cutting.

By the axial trimming the length of the blade 3 is reduced. For example the length of the chord line C is reduced, because the distance from the leading edge 33 to the modified trailing edge 341 is smaller than the distance from the leading edge 33 to the initial trailing edge 34. The shortening of the blade 3 can also be measured by other lengths, for example the contact line, along which the blade 3 is connected to the hub 2 is shorter after the axial trimming. Furthermore, the length of the blade tip 35 as measured along the blade tip 35 is smaller after the axial trimming.

Figure 6:
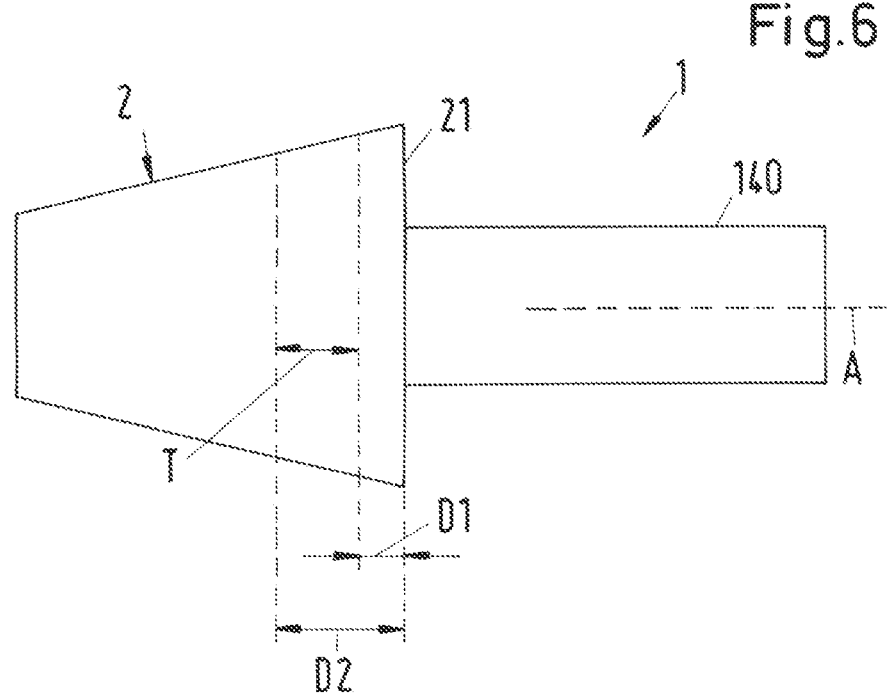
FIG. 6 is a schematic representation for illustrating distances.

The reduction of the length of the blade 3 is also illustrated in the schematic representation of FIG. 6.

Regarding the base propeller 1a, the blade 3 has a first axial distance D1 measured from the axial end 21 of the hub 2 in the axial direction A along the hub 2 to the initial trailing edge 34. Regarding the propeller 1 after the axial trimming, the blade 3 has a second axial distance D2 measured from the axial end 21 of the hub 2 in the axial direction A along the hub 2 to the modified trailing edge 341. The second axial distance D2 is larger than the first axial distance D1. The difference D2-D1 between the second axial distance D2 and the first axial distance D1 is referred to as trimming distance T.

One of the advantages of the axial trimming is that the radial dimension of the propeller 1 is not changed. Therefore, the distance or the gap between the propeller 1 and the wear ring 170 remains unchanged by the axial trimming, so that there is no need for any additional adjustment measures.

The axial trimming is used to adapt the Bead flow curve of the propeller 1 to the specific application. By the axial trimming the head flow curve of the base propeller 1a is modified, for example shifted. For a specific application a duty point is predefined or desired. The duty point is given by the flow and the head, at which the propeller 1 shall be operated. Thus, the duty point is a pair of values, one of which designates the flow (volume of fluid per time), and the other one designates the head to which the fluid shall be conveyed. By means of the axial trimming the head flow curve of the propeller 1 is modified such, that the best efficiency point of the head flow curve coincides with—or is at least as close as possible to—the desired duty point.

The trimming distance T is adjusted such, that the best efficiency point of the head flow curve of the propeller 1 is at the desired duty point.

The modified trailing edge 341 is preferably formed in such a way that the length of the blade tip 35 at the hub 2 is reduced by an amount which essentially equals the trimming distance T.

Furthermore, it is preferred that the modified trailing edge 341 is configured as a trailing face 361 (see FIG. 4), wherein the trailing face 361 is non-curved, As another preferred measure the trailing face 361 is configured to include a trimming angle α with the axial direction A (see FIG. 7), wherein the trimming angle α is measured between the trailing face 361 and the hub 2. Preferably, the trimming angle α is at least 90° and even more preferred the trimming angle α is larger than 90°. For a better understanding FIG. 7 shows a representation of the propeller 1, in which the trimming angle α is illustrated.

Figure 7:
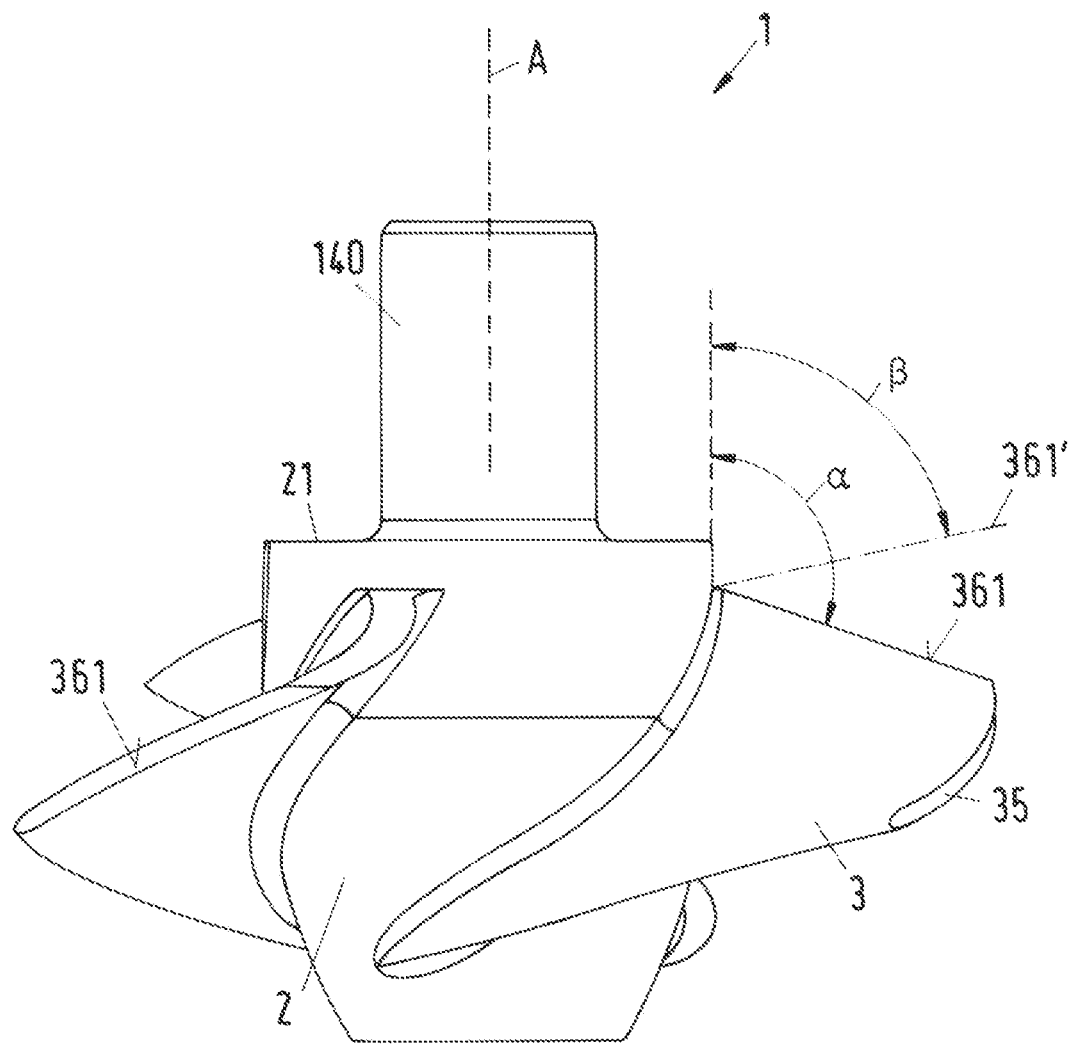
FIG. 7 is a representation of the propeller of FIG. 3 for illustrating the trimming angle.

In other embodiments the axial trimming can be performed in such a manner that a trimming angle β is realized, which is smaller than 90° as it is indicated by the dash dotted line in FIG. 7 representing a trailing face 361' of another embodiment of the propeller 1.

Using the axial trimming as a measure to adapt the propeller 1 to a desired duty point has the considerable advantage that the entire performance range for the propeller pump 100 can be covered with a small number of different base propellers 1a, for example only two different base propellers 1a. Depending on the specific application and the desired duty point, at which the propeller pump 100 shall be operated, one of the base propellers 1a is selected and then adapted to the desired duty point by the axial trimming. The small number of required base propellers 1a to cover the entire performance range results in an advantageous reduction of the required patterns for the casting molds for manufacturing the base propellers 1a.

Depending on how much of the initial trailing edge 34 has been removed by the axial trimming to form the modified trailing edge 341, it can be advantageous to further machine the modified trailing edge 341, for example to regain or to increase the hydraulic efficiency of the propeller pump 100.

A preferred measure for increasing the hydraulic efficiency after the axial trimming has been performed comprises the step of forming at each blade 3a final trailing edge 342 by removing a part of the pressure side 31 abutting against the modified trailing edge 341 along the entire modified trailing edge 341, so that a transition face 37 (see FIG. 2) is produced connecting the pressure side 31 with the final trailing edge 342.

Figure 5:
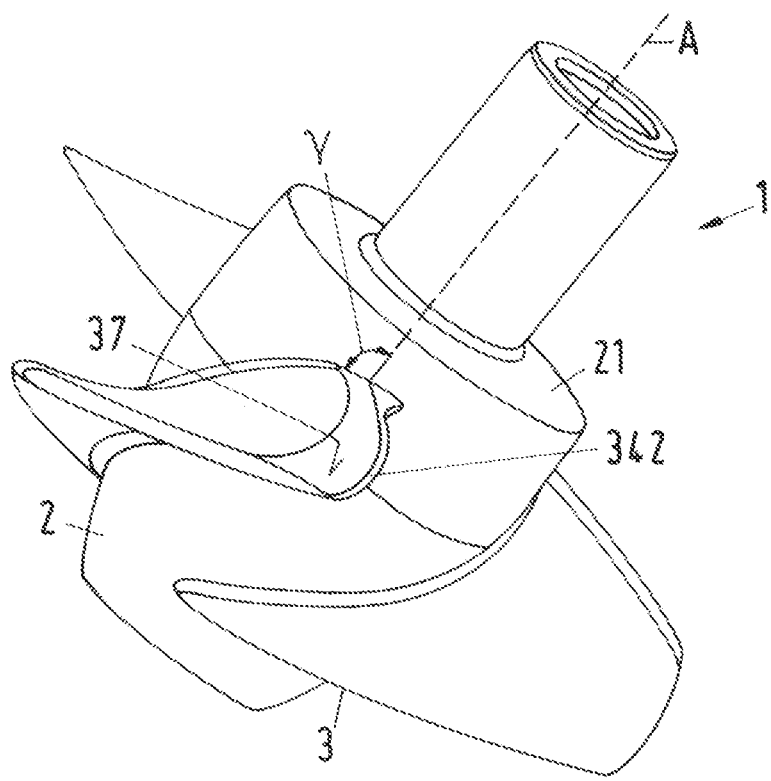
FIG. 5 is a perspective view of the propeller of FIG. 4 after the optional step of forming a final trailing edge.

This manufacturing step is also referred to as overfiling. FIG. 5 shows a perspective view of the propeller 1 of FIG. 4 after the optional step of forming the final trailing edge 342.

Preferably, the step of forming the final trailing edge 342 is performed such, that the transition face 37 extends from the hub 2 along the entire final trailing edge 342, and that the transition face 37 is inclined towards the pressure side 31.

In FIG. 5 and in FIG. 2a configuration is shown, in which the final trailing edge 342 is formed as a face. In other embodiments the overfiling is performed such that the final trailing edge 342 is essentially a line rather than a face, Referring to the representation in FIG. 2 this means that the slanted transition face 37 directly connects the pressure side 31 with the suction side 32. Thus, in FIG. 2 the straight line representing the transition face 37 would extend from the pressure side 31 to the suction side 32, so that the final trailing edge 342 would be represented in FIG. 2 by a point, namely the intersection between the transition face 37 and the suction side 32.

Furthermore, it is preferred that the transition face 37 is configured as a non-curved face. In addition, it is preferred that the transition face 37 is configured to include a filing angle γ with the axial direction A with the filing angle γ being different from 90°, as it is shown in FIG. 5.

Regarding the number of blades 3 provided at the hub 2 for many applications three blades 3 are preferred. For other application a number of only two blades 3 or a number of four or five blades 3 can be advantageous.

What is claimed is:

1. A method for manufacturing a propeller for a propeller pump, the propeller configured to rotate about an axial direction, comprising:
providing a base propeller comprising a hub extending from an axial end in the axial direction, and a plurality of blades fixedly connected to the hub, each blade of the plurality of blades comprising a pressure side, a suction side, a leading edge, an initial trailing edge, and a blade tip extending from the leading edge to the initial trailing edge at an end of the blade facing away from the hub;
trimming each of the plurality of blades of the base propeller in the axial direction; and
forming a modified trailing edge by removing a part of the initial trailing edge along the entire pressure side from the hub to the blade tip,
at each blade of the plurality of blades forming a final trailing edge by removing a part of the pressure side abutting against the modified trailing edge along an entirety of the modified trailing edge, so that a transition face is produced connecting the pressure side with the final trailing edge.

2. The method in accordance with claim 1, wherein each modified trailing edge is formed by machining.

3. The method in accordance with claim 1, wherein for each blade a first axial distance measured from the axial end of the hub along the hub to the initial trailing edge is smaller than a second axial distance measured from the axial end of the hub along the hub to the modified trailing edge.

4. The method in accordance with claim 3, wherein a duty point for the propeller is provided, and a trimming distance defined as the difference between the second axial distance and the first axial distance is adjusted such that the duty point is realized.

5. The method in accordance with claim 4, wherein the modified trailing edge is a trailing face, and the trailing face is non-curved.

6. The method in accordance with claim 5, wherein the trailing face includes a trimming angle with the axial direction, the trimming angle is measured between the trailing face and the hub, and the trimming angle is at least 90°.

7. The method in accordance with claim 6, wherein the modified trailing edge is formed by machining the initial trailing edge with the trimming angle in such a way that a length of the blade is reduced at the hub by an amount, which equals the trimming distance.

8. The method in accordance with claim 1, wherein the transition face extends from the hub along the entirety of the final trailing edge, and the transition face is inclined towards the pressure side.

9. The method in accordance with claim 1, wherein the transition face is a non-curved face.

10. The method in accordance with claim 9, wherein the transition face includes a filing angle with the axial direction with the filing angle being different from 90°.

11. The method in accordance with claim 1, wherein the plurality of blades of the propeller comprises exactly three blades.

12. A propeller for a propeller pump, wherein the propeller is manufactured according to claim 1.

13. A propeller pump for conveying a fluid, comprising: a propeller according to claim 12.

14. The propeller pump in accordance with claim 13, further comprising a pump housing having an inlet and an outlet for the fluid, a pump shaft configured to rotate the propeller about the axial direction, and a drive unit configured to rotate the pump shaft, the propeller fixedly connected to the pump shaft, and the drive unit arranged inside the pump housing.

15. The propeller pump in accordance with claim 13, wherein the propeller pump is a submersible pump.

* * * * *